Patented Sept. 14, 1926.

1,599,903

UNITED STATES PATENT OFFICE.

EDWIN C. E. LORD, OF WASHINGTON, DISTRICT OF COLUMBIA, DEDICATED TO THE GOVERNMENT AND THE PEOPLE OF THE UNITED STATES OF AMERICA.

PROCESS FOR WATERPROOFING PORTLAND-CEMENT CONCRETE.

No Drawing.    Application filed December 14, 1925.   Serial No. 75,475.

(GRANTED UNDER THE ACT OF MARCH 3, 1883; 22 STAT. L. 625.)

This application is made under the act of March 3, 1883, chapter 143 (22 Stat. 625) and the invention herein described and claimed may be used by the Government of the United States or any of its officers or employees in the prosecution of work for the Government, or by any person in the United States, without payment to me of any royalty thereon.

My process is based on the water repellant properties of paraffin or similar material when brought in intimate contact with the constituents of Portland cement concrete.

The process consists in incorporating paraffin, or similar material, with the constituents of the concrete in such a manner that all constituents are sufficiently coated with the waterproofing material to prevent the ingress of water or other liquids after the concrete has properly set and hardened.

In order to attain this desired effect I first dissolve paraffin, or similar material, with kerosene in sufficient quantity to produce a 20 per cent solution by weight of paraffin. I then unite this solution with boiling water containing approximately 1 per cent by weight of ordinary laundry soap and stir vigorously until the paraffin assumes the form of a perfectly stable emulsion. This stable emulsion is added to the mixing water used in making up the concrete in the proportions of about one to three.

The proportions of the several ingredients are not of any particular importance, so long as the desired effect is obtained, and any proportions within reasonable limits will accomplish this effect. An example of the process is as follows: I mixed 20 ounces of paraffin with 80 ounces of kerosene and to this mixture I added 1 gallon of boiling water which contained 1 per cent by weight of ordinary laundry soap; then I stirred vigorously until the paraffin-kerosene solution assumed the form of a perfectly stable emulsion with the soap-water solution; this mixture was then combined with the mixing water used in making up the concrete in the proportion of 1 to 3.

I claim:—

A process for waterproofing Portland cement concrete consisting in introducing into the water with which the cement is to be mixed, paraffin emulsified with kerosene and soap water, to prevent the ingress of water and other liquids after the concrete has properly set and hardened.

EDWIN C. E. LORD.